(12) United States Patent
Li (10) Patent No.: US 11,262,622 B2
(45) Date of Patent: Mar. 1, 2022

(54) DISPLAY PANEL AND DISPLAY APPARATUS

(71) Applicant: BOE TECHNOLOGY GROUP CO., LTD., Beijing (CN)

(72) Inventor: Hui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/954,193

(22) PCT Filed: Dec. 23, 2019

(86) PCT No.: PCT/CN2019/127556
§ 371 (c)(1),
(2) Date: Jun. 15, 2020

(87) PCT Pub. No.: WO2020/164312
PCT Pub. Date: Aug. 20, 2020

(65) Prior Publication Data
US 2021/0263353 A1 Aug. 26, 2021

(30) Foreign Application Priority Data
Feb. 13, 2019 (CN) .......................... 201920195214.7

(51) Int. Cl.
*G02F 1/1337* (2006.01)
*G02F 1/1335* (2006.01)

(52) U.S. Cl.
CPC ...... *G02F 1/1337* (2013.01); *G02F 1/133512* (2013.01); *G02F 1/133514* (2013.01)

(58) Field of Classification Search
CPC ............. G02F 1/1337; G02F 1/133512; G02F 1/133514

USPC .......................................................... 349/56
See application file for complete search history.

(56) References Cited

FOREIGN PATENT DOCUMENTS

| CN | 102799029 A | * | 11/2012 |
| CN | 102799029 A | | 11/2012 |
| CN | 107193161 A | * | 9/2017 |
| CN | 107193161 A | | 9/2017 |
| CN | 108983503 A | * | 12/2018 |
| CN | 108983503 A | | 12/2018 |

OTHER PUBLICATIONS

International Search Report in Application No. PCT/CN2019/127556, dated Mar. 23, 2020.

* cited by examiner

*Primary Examiner* — Nathanael R Briggs
*Assistant Examiner* — William D Peterson
(74) *Attorney, Agent, or Firm* — Syncoda LLC; Feng Ma (57) ABSTRACT

A display panel includes: a first substrate; a second substrate; a first alignment film layer provided on the first substrate, wherein the first alignment film is sandwiched between the first substrate and the second substrate; a plurality of protruding regions formed about a perimeter edge portion of the first substrate, wherein the plurality of protruding regions include an associated trench region provided in a plurality thereof, wherein each trench region includes at least one trench, each trench being configured to retain a portion of the first alignment film layer or the second alignment film layer when sandwiched between the first substrate and the second substrate so as to limit shrinkage of the first alignment film layer or the second alignment film layer during operation of the display panel.

20 Claims, 7 Drawing Sheets

FIG. 7

DISPLAY PANEL AND DISPLAY APPARATUS

CROSS-REFERENCE TO RELATED APPLICATIONS

The present application is a national stage of International Application No. PCT/CN2019/127556 filed on Dec. 23, 2019, which claims priority to Chinese Patent Application No. 201920195214.7 filed on Feb. 13, 2019. The disclosures of these applications are hereby incorporated by reference in their entirety.

TECHNICAL FIELD

The present disclosure relates generally to the technical field of displays, and more specifically to a display panel and a display apparatus.

BACKGROUND

A conventional liquid crystal display (LCD) typically includes two substrates and a liquid crystal layer between the two substrates.

When the liquid crystal display performs image display, the injected liquid crystal molecules start to be oriented in a constant direction in the trench formed by the alignment film layer.

When an electric field is applied, the liquid crystal molecules rotate, and the alignment change of the liquid crystal molecules causes the polarization characteristics of the light to change. Enabling the display device to cause the display of an image.

SUMMARY

Various embodiments of the present disclosure provide a display panel, and a display apparatus.

In an aspect, a display panel is provided, including:
a first substrate;
a second substrate;
a first alignment film layer provided on the first substrate, wherein the first alignment film is sandwiched between the first substrate and the second substrate:
a plurality of protruding regions formed about a perimeter edge portion of the first substrate,
wherein:
the plurality of protruding regions include an associated trench region provided in a plurality thereof; and
each trench region includes at least one trench, each trench being configured to retain a portion of the first alignment film layer or the second alignment film layer when sandwiched between the first substrate and the second substrate so as to limit shrinkage of the first alignment film layer or the second alignment film layer during operation of the display panel.

In some embodiments, at least one trench region is formed having a patterned layer, and wherein at least one trench is formed by the patterned layer.

In some embodiments, the first substrate is a color film substrate, and the second substrate is an array substrate.

In some embodiments, the first substrate is an array substrate, and the second substrate is a color film substrate.

In some embodiments, the patterned layer is located on the color filter substrate, and wherein the patterned layer is at least one of a black matrix layer, a colored color resist layer, and a planarization layer.

In some embodiments, the patterned layer is located on the array substrate and wherein the patterned layer is at least one of an inorganic layer, a planarization layer, or a metal layer.

In some embodiments, a perimeter edge of both the first substrate and the second substrate forms a polygonal shape, and each corner of the polygon shape is provided with one of the protruding regions.

In some embodiments, a perimeter edge of both the first substrate and the second substrate forms a polygonal shape wherein the plurality of protruding regions and associated trench regions thereof are provided along at least two sets of opposing edges of the polygon shape.

In some embodiments, the trenches extend in a direction being non-parallel with the edges of each substrate.

In some embodiments, each trench extends in a direction parallel to at least one of the two sides of a corner in which the trench is located.

In some embodiments, each trench extends in a direction parallel to each side of the polygon shape.

In some embodiments, each of the trench regions includes a plurality of trenches, and a distance between each adjacent two trenches is the same.

In some embodiments, each of the trench regions includes a plurality of trenches, and a distance between each adjacent two trenches varies.

In some embodiments, each trench has a width of 5 to 40 μm.

In some embodiments, each trench has a depth of 2 to 15 μm.

In some embodiments, each trench has a depth of 2 to 15 μm.

In some embodiments, the display panel further includes a second alignment film layer provided on the second substrate, wherein the second substrate is also sandwiched between the first substrate and the second substrate.

In some embodiments, the first alignment film layer is planar and extends radially beyond each trench.

In some embodiments, the first alignment film layer includes an alignment liquid, a portion of the alignment liquid being retained in each trench.

In some embodiments, the display panel further includes a second alignment film layer; wherein:
the second alignment film layer is planar and extends radially beyond each trench; and
the second alignment film layer includes a second alignment liquid, a portion of the second alignment liquid being retained in each trench.

In another aspect, a display apparatus is provided, including the display panel described above.

In some embodiments, the display apparatus further including a speaker, and a controller to control the speaker and the display panel.

Other embodiments may become apparent in view of the following descriptions and the attached drawings.

BRIEF DESCRIPTION OF THE DRAWINGS

In order to more clearly illustrate the technical solutions of the embodiments of the present disclosure, the drawings used in the embodiments of the present disclosure will be briefly described below. Obviously, the drawings described below are only some implementations of the present disclosure. For example, those skilled in the art can obtain drawings of other embodiments according to the drawings without any creative work.

DETAILED DESCRIPTION

Various embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" is another element, it can be directly on or extend directly onto the other element or intervening elements may also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "horizontal" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In order to display the high contrast and uniform brightness of the device, the initial orientation of the liquid crystal molecules should be strictly controlled. However, due to the nature of the material of the alignment film, the alignment film layer will shrink, so that the alignment layer corresponding to the protruding region of the edge contour of the substrate in the display panel Contracting toward the center;

Due to the shrinkage of the alignment film layer, the alignment film layer is often not present in the protruding region of the edge contour of the substrate. Therefore, the liquid crystal molecules in the protruding region cannot be regularly oriented, resulting in light leakage at the edge of the display panel, reducing display quality and improving. The probability of display failure due to uneven diffusion of the alignment liquid.

As such, due to the shrinkage of the alignment film layer at the edge portion, light leakage occurs at the edge of the display panel, and the display quality is lowered. Various embodiments of the present disclosure can provide a display panel and a display addressing the problem of light leakage caused by shrinkage of the alignment film layer in the prior art due to shrinkage of the alignment film layer, and the display quality is lowered.

In some embodiments, a display panel is provided including two substrates, each of which is provided with an alignment film layer toward a surface of another substrate, and at least one edge of the substrate is formed with a plurality of protruding regions; a region of the substrate corresponding to at least one protruding region of the edge profile thereof is formed with a trench region, each of the trench regions is provided with at least one trench, and the substrate is provided with an alignment film layer extending to the trench area, preventing the shrinkage of the alignment film layer causes light leakage at the edge of the display panel, improving the display quality, and reducing the probability of display failure due to uneven diffusion of the alignment liquid on the display panel.

As shown in FIGS. 1-6, contemplated herein is a display panel 10, or a display having at least one display panel 10 associated therewith, which when used solves or mitigates a problem with regard to a light leakage phenomenon which occurs at an edge of the display panel due to the shrinkage of the alignment film layer in the prior art, which leakage causes a significant reduction in display quality.

Figure 1:
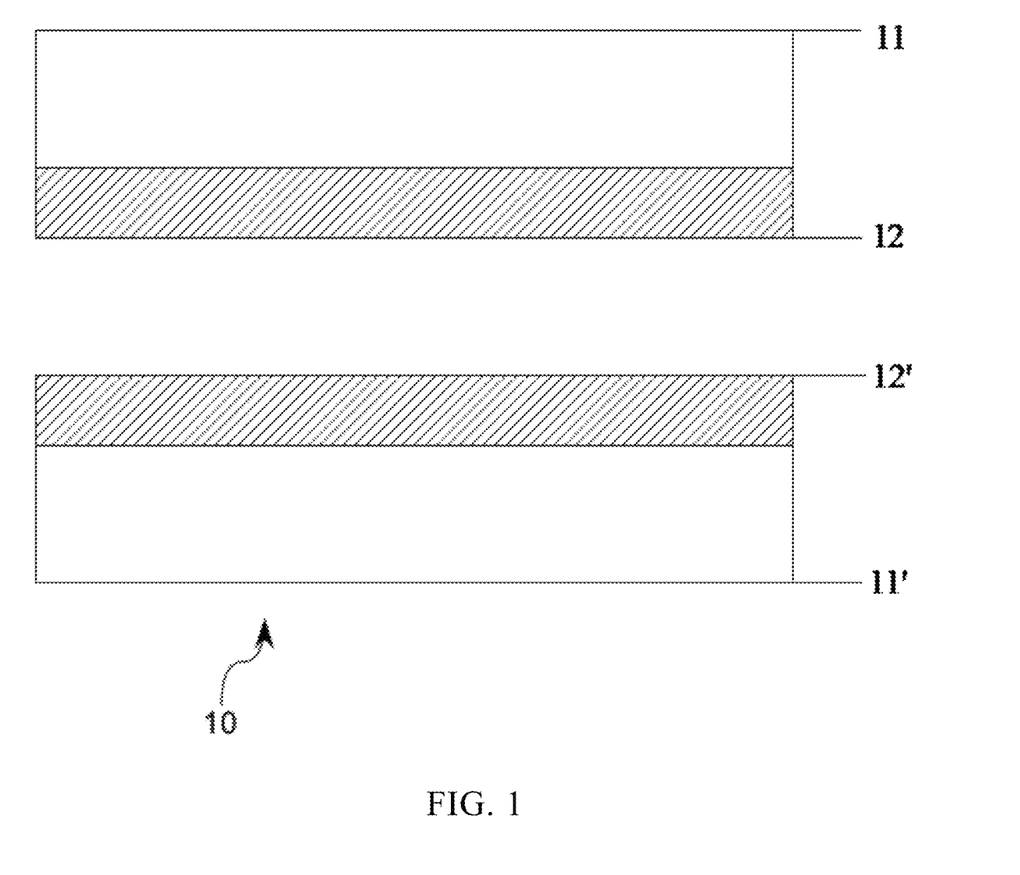
FIG. 1 illustrates a structural view of a first display panel provided by some embodiments of the present disclosure.

In order to achieve the above-mentioned solution, the present disclosure provides a display panel 10 comprising two opposing substrates, i.e. first substrate 11 and second substrate 11', wherein each of the substrates can be provided with an associated alignment film layer, i.e. first alignment film layer 12 and second alignment film layer 12' respectively.

As illustrated herein, the alignment film layers can be provided on interior facing surfaces of their respective substrates such that they interface or oppose one another when pressing the associated substrates together.

The display panel 10 according to some embodiments of the present disclosure can then include an edge or perimeter portion having a plurality of protruding regions 13 provided thereabout.

In some such embodiments, at least one of the substrates includes an opposing region of the substrate corresponding to at least one protruding region 13 located about the edge or perimeter thereof.

As illustrated herein, the protruding region 13 can be formed with a trench region 14 therein, wherein each of the trench regions 14 can be provided with at least one trench 141. In such embodiments, the first substrate 11 can be provided such that its associated alignment film layer 12 extends at least to the trench 141 provided within the trench region 14.

Again, as discussed briefly above, the display panel 10 will include at least two substrates 11 and 11', and each of the substrates is provided with an alignment film layer 12 and 12' which each face toward an opposing surface of the opposing substrate such that the associated alignment film layers also face one another.

The perimeter edge portion of one of the substrates is formed having a plurality of protruding regions 13, and an opposing region corresponding to at least one protruding region 13 being configured to receive the protruding region of the opposing substrate.

Within each protruding region is a trench region 14, wherein each of the trench regions are provided with at least one trench 141 therein. Each alignment film layer 12 and 12' provided on their corresponding substrates 11 and 11' extend into the trench region 14, and past the at least one trench 141 formed within the trench region 14.

The portion of the alignment film layers 12 and 12' which extend into the trench region 14, have an associated alignment liquid contained therein which is configured so as to remain in the trench.

The portion of alignment liquid which extends into the trench 141 then prevents the shrinkage of the alignment film layer 12, and reduces the phenomenon of edge-drain due to shrinkage of the alignment film layer, and thus improves display quality.

Another benefit realized by this portion of alignment liquid being retained in the trench is that it reduces poor display probability of the panel which was realized in the prior art due to uneven diffusion of the alignment liquid.

In some embodiments, the two substrates 11 and 11' can be provided as a color film substrate and an array substrate.

Further, in some embodiments, the first substrate 11 can be provided with the trench region 14, and an opposing region provided on the second substrate 11' can be formed with a patterned layer 15 provided on an opposing surface of second substrate opposite trenches 141 as formed in the first substrate 11. In some embodiments both substrates can have a patterned layer wherein contours of the patterns form the trenches 141 in both surfaces of the substrates which face one another.

In some embodiments, such as when the patterned layer is located on the color filter substrate, the patterned layer can include at least one of a black matrix layer, a colored color resist layer, and a planarization layer. Further, if the patterned layer is located on the array substrate, the patterned layer can include at least one of an inorganic layer, a planarization layer, and a metal layer.

In some embodiments, the perimeter portion can include an edge contour, wherein the edge contour can be provided having a polygonal shape. In some such embodiments, each corner of the polygon can be configured such that the corner forms at least one, but in some cases all, of the protruding regions.

In some such embodiments the direction in which the trenches of the patterned layer extend can be configured such that they intersect the two sides of the corner where the trench is located. Alternatively, the trench in the patterned layer can be configured such that it extends in a direction parallel to at least one of the two sides of the corner where the trench is located.

In some additional embodiments, each of the trench regions 13 can include a plurality of trenches 141. In some such embodiments the spacing between each trench 141 can be constant, i.e. the distance between each adjacent trench can be the same or varied. In some exemplary embodiments, the width of each trench can be in a range of 5 to 40 µm. Further, in some exemplary embodiments, the depth of each trench can be in a range of 2 to 15 µm.

The present disclosure also provides a display or display system which can include one or more of the display panels discussed above according to any one of the above aspects.

The technical solutions in the embodiments of the present disclosure will be clearly and completely described in conjunction with the drawings in the embodiments of the present disclosure. It is obvious that the described embodiments are only a part of the embodiments of the present disclosure, and not all of the embodiments. Based on the embodiments of the present disclosure, all other embodiments obtained by those skilled in the art without creative efforts are within the scope of the present disclosure.

The embodiment of the present disclosure provides a display panel 10 and a display which may have one or more such display panels provided therein. As discussed above the display panel 10 has two opposing substrates, a first substrate 11 and a second substrate 11'.

The first substrate 11 can include at least one protruding region 13 provided about an edge portion thereof. Within the protruding region 13 is a trench region 14 having one or more trenches 141 provided therein. Between the opposing first and second substrates 11 and 11' is at least one alignment film layer 12.

However, in some embodiments each substrate 11 and 11' can have an associated alignment film layer 12 and 12' provided on their opposing surfaces such that they can be sandwiched therebetween. The alignment film layer(s) are planar and extend to, or nearly to, the perimeter edge of their associated substrate. In the embodiments discussed herein, as the trench regions 14 reside about a perimeter edge and extend radially inwardly into the associated substrate, the alignment film layers 12 should extend sufficiently close to the perimeter edge of each substrate such that they extend into or over at least one of the trenches 141 provided within the trench region 14.

Then during operation, the alignment film layer, which is sandwiched into the trenches 141, will remain in the trench 141, and thus prevent the shrinkage of the alignment film layer, which will have an associated effect of reducing the phenomenon of light leakage of the display panel due to the shrinkage of the alignment film layer, as the alignment film layer will be prevented from shrinking due to being retained in opposing protruding regions 13 provided at opposing edges of the substrate. This will then summarily improve the display quality, and reduce the probability of display failure due to uneven diffusion of the alignment liquid in the alignment film layer of the display panel.

Specifically, as shown in FIG. 1, a display panel 10 is illustrated according to an embodiment of the present disclosure includes two substrates, which are a first substrate 11 and a second substrate 11'. As illustrated here, a surface of each of the substrates faces a corresponding inwardly facing surface of the other substrate.

An alignment film layer 12 is disposed on the surface of the first substrate 11 or the second substrate 11', that is, an alignment film layer 12 is disposed on a surface of the first substrate 11 facing the first substrate 11'. Similarly, a second alignment film layer 12' can be disposed on a surface of the second substrate 11' facing the first substrate 11, insomuch as at least one alignment film layer 12 is provided therebetween.

An edge profile of one of the substrates is formed with a plurality of protruding regions 13 configured to sandwich and retain the relative position of the alignment film layer(s) 12 between the first and second substrate.

Figure 2:
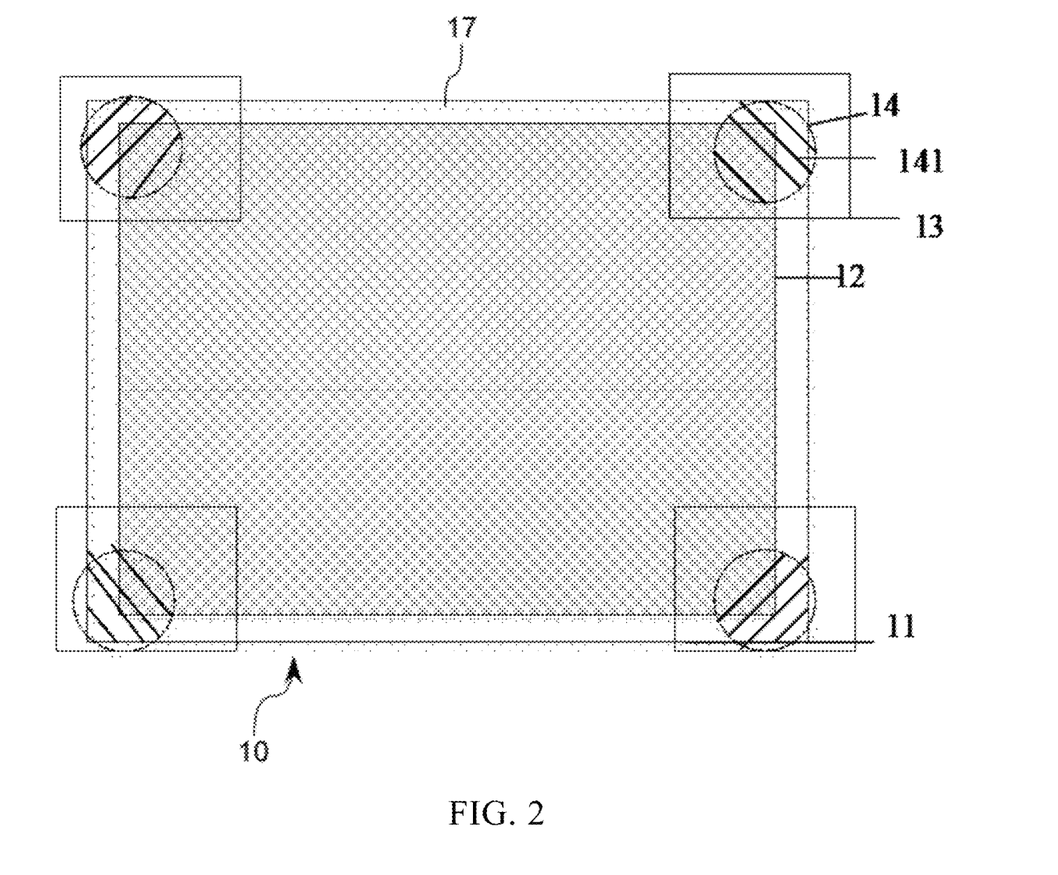
FIG. 2 illustrates a first structural view of a substrate in a display panel provided by some embodiments of the present disclosure.

Specifically, as shown in FIG. 2, the plurality of protruding regions 13 are formed by forming an edge profile of the first substrate 11 in which the first substrate 11 has an area corresponding to at least one protruding region 13 of the edge contour thereof. Trench regions 14 are formed within the protruding regions 13, each of which is provided with at least one trench 141, and the first substrate 11 is provided with an alignment film layer 12 extending into the trench region 14.

As illustrated herein, the first substrate 11 in the display panel can be a color filter substrate 11, and the second substrate 11' in the display panel can be provided as an array substrate. Alternatively, the first substrate 11 in the display panel can be an array substrate, and the second substrate 11' in the display panel can be a color film substrate.

Specifically, as illustrated herein at least one protruding region 13 can be located at a corner or a curved portion of the first substrate 11 about an edge portion thereof.

Figure 3:
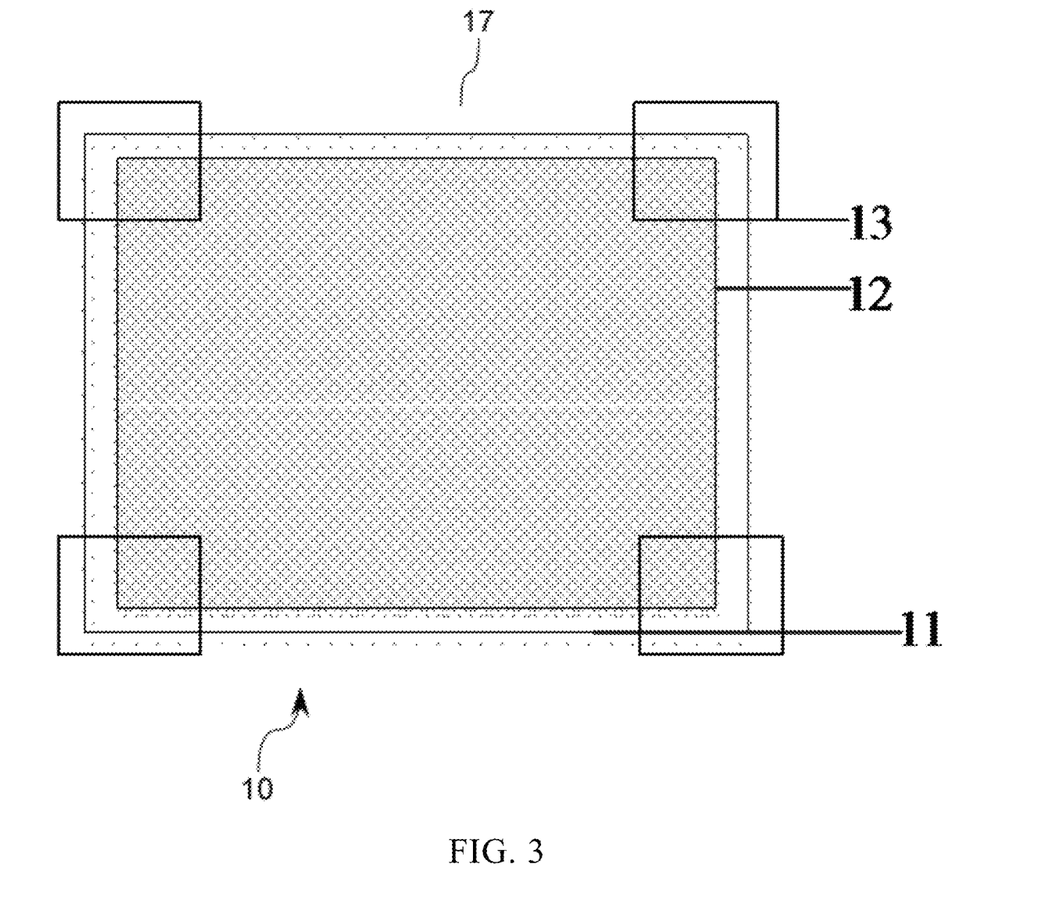
FIG. 3 illustrates a schematic view showing the edge region of the substrate having protruding regions.

Also as illustrated herein, the first substrate 11 can be formed as a rectangle, and the protruding region 13 is located at four corners of the rectangle, as shown in FIG. The box area at the corner shown. It will then be appreciated that the first substrate 11 can have varying rectangular, square, curved, or any other polynomial or geometric shape, and that the protruding regions, while illustrated at angular portions thereof, can also be provided about straight edges thereof.

It should be noted that, if the edge contour of the second substrate 11' is formed with a plurality of protruding regions 13 in the second substrate 11'. The second substrate 11' will then have similar properties to the protruding region, trench region, and trenches as discussed above with respect to the first substrate 11.

Also contemplated herein, is a trench region is formed in a region corresponding to the protruding region of the edge contour of the substrate. The trench region can be provided with at least one trench, and when the alignment film layer extends into the trench region, the alignment liquid of the alignment film layer will remain in the trench, such that a perimeter portion of the alignment film layer corresponds to the trench region. This retention within the trenches allows for the edge profile of the alignment layer to resist shrinking, thus reducing edge leakage and improving display quality and product yield.

Based on the above, if both substrates in the display panel are provided with protruding regions, trench regions and trenches, the structures of the two substrates can be substantially the same or the shapes can coincide with one another. For example, in such embodiments, the trench region 14 in the first substrate 11 has a trench 141 formed by a patterned layer 15 located in a region of the first substrate 11 corresponding to the trench region 14, i.e., in the trench region 14.

Figure 4:
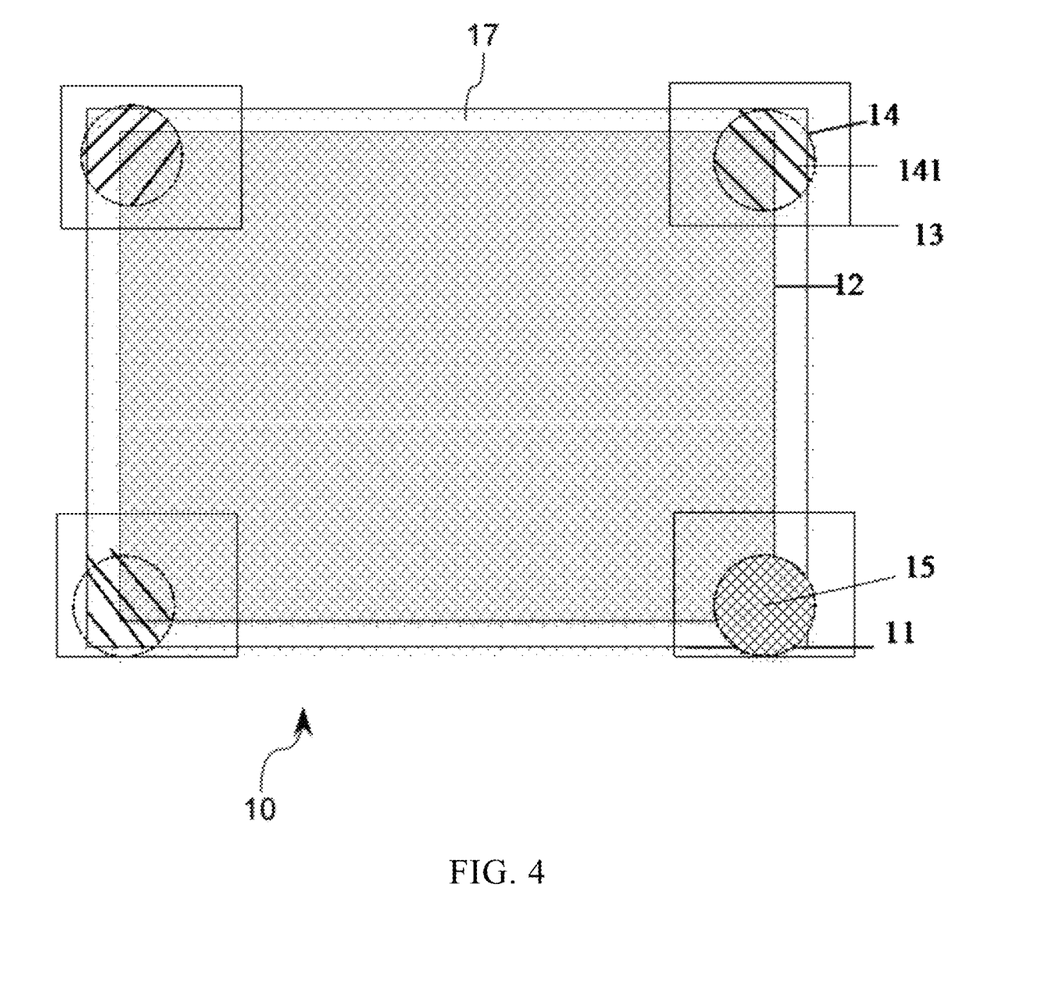
FIG. 4 illustrates a second structural view of a substrate in a display panel provided by some embodiments of the present disclosure.

In some such embodiments the patterned layer 15 cam disposed in the corresponding perimeter region, and a trench 141 is formed on the patterned layer 15; as shown in FIG. 4. The circular region illustrated herein can be a trench region 14, and the matrix illustrated herein is illustrative of a pattern. Each protruding region 13 can then be provided with a patterned layer 15 corresponding to each of the trench regions 14, as drawn for illustrative purposes only in FIG. 4.

The display panel of the present disclosure includes two substrates, and as long as at least one of the two substrates has a trench region formed in a region corresponding to the protruding region of the edge contour thereof, and the trench region is provided with a trench and an alignment film layer Extending into the trench can reduce the phenomenon of edge leakage and improve the display quality and product yield. Therefore, the present disclosure can be provided with a trench on one substrate or a trench on both substrates.

Provided below are some of examples, in particular, as illustrated herein a first embodiment is provided in which a substrate corresponding to a region of the edge having a protruding region is formed with a trench region, and at least one trench is provided in the trench region, and the first substrate 11 is described below.

Contemplated herein is a first case wherein the first substrate 11 is a color film substrate. In such an embodiment when the edge contour has a region corresponding to the protruding region 13 formed with a trench region 141, and the trench region when the first substrate 11 having at least one trench 141 in the 141 is a color filter substrate, the patterned layer 15 forming the trench 141 can include at least one of a black matrix layer, a colored color resist layer, and a planarization layer.

Figure 5:
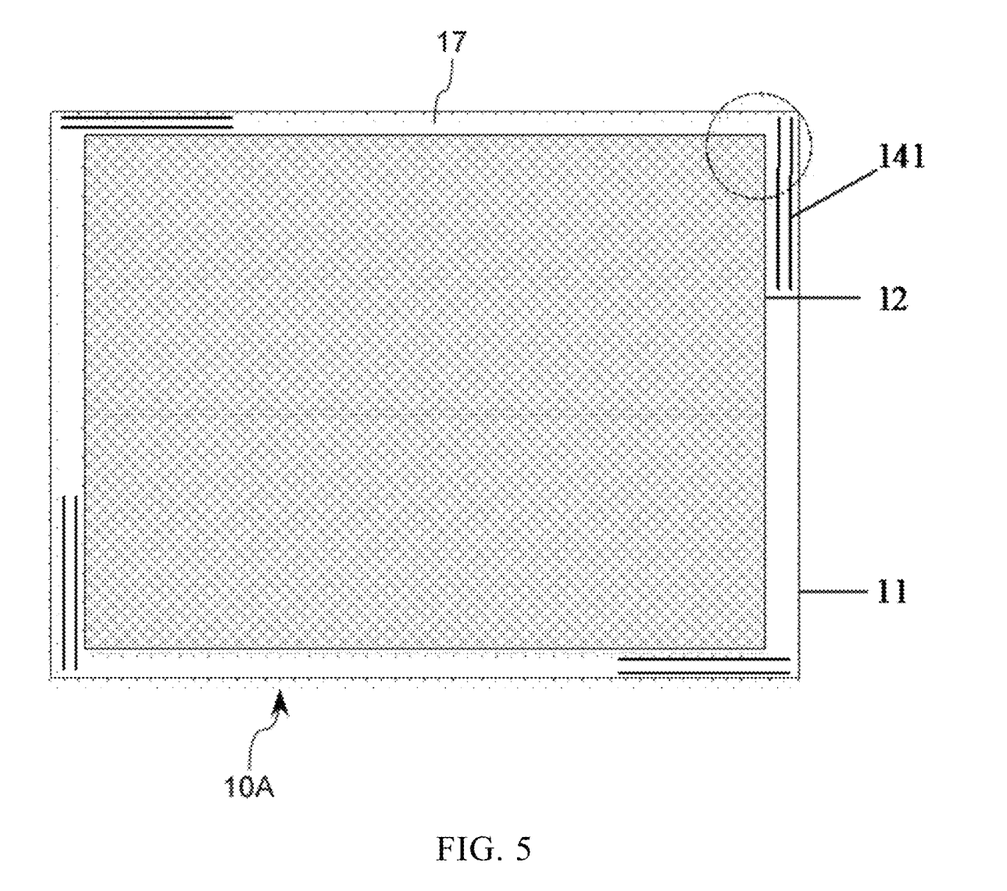
FIG. 5 illustrates a schematic view showing the extending direction of a trench in a display panel according to some embodiments of the present disclosure.
Figure 6:
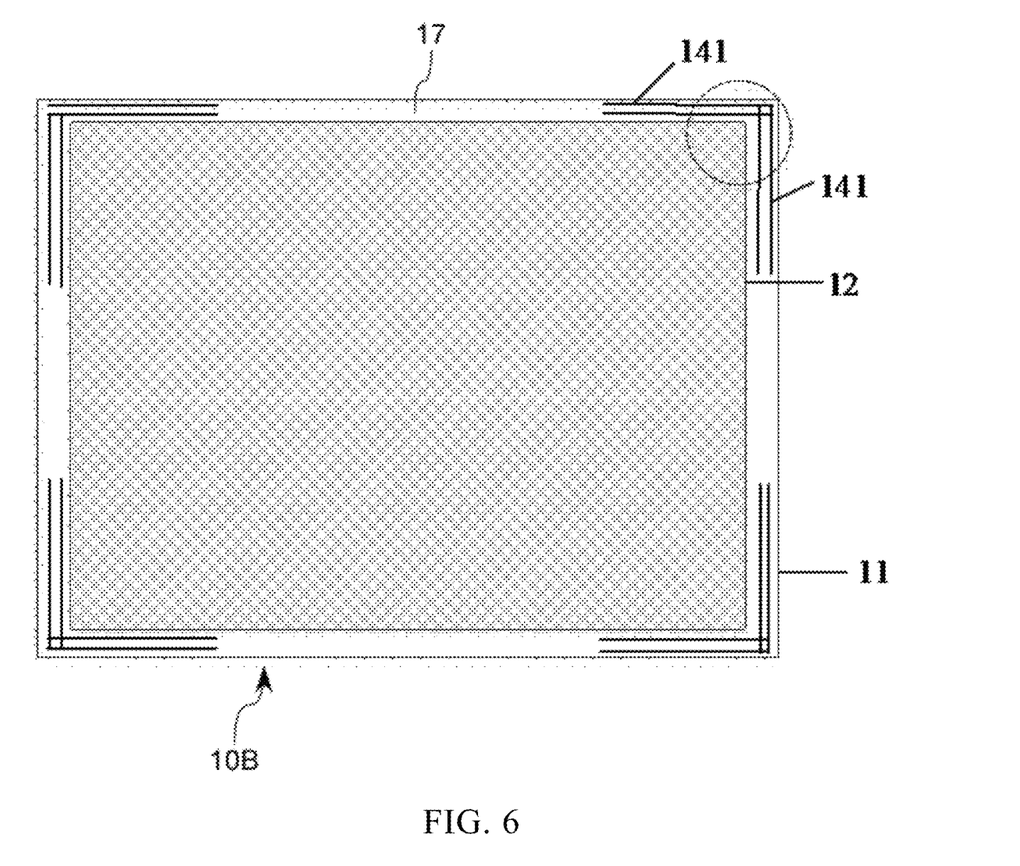
FIG. 6 illustrates a schematic view showing the extending direction of the trench in another display surface provided by some embodiments of the present disclosure.

In some alternative embodiments, as illustrated in FIGS. 5 and 6, the display panels 10A and 10B respectively can both include a protruding region 13, which can extend along an entire perimeter edge 17 of the substrate.

As illustrated in FIG. 5, the trenches 141 can extend along only a portion of the perimeter edge extending into a corner thereof. As illustrated in FIG. 6, the trenches 141 can extend along an entire perimeter of the substrate and around the corners thereof.

In some such embodiments, the trenches along one perimeter edge can intersect the trenches along an adjacent perimeter edge.

Also contemplated in these embodiments is a situation in which each trench can be provided with the patterned layer 15 as discussed above.

In some such embodiments, at least one trench 141 can be located in a corresponding perimeter region 17, wherein the entire perimeter region 17 can include a patterned layer 15 having at least one trench, can both be located in the trench region 141, and the trench 141 can be extended about the entire perimeter of the substrate.

In some embodiments, the trench 141 can have a width of 5 to 40 µm, and the trench 141 can also have a depth of 2 to 15 µm. When a plurality of trenches 141 are included in the trench region 141, the distance between each adjacent two trenches 141 is the same or it can vary.

The protruding region 13 can in some instances be disposed at a corner or a curved portion of the first substrate 11. In other words, the protruding region 13 can disposed in a region where the alignment liquid is easily reflowed. In such instances, the trench region 14 can be disposed in the reflowable region. The trench 141 can thus be used for retaining the alignment liquid to prevent the alignment liquid from flowing back.

In such instances, if the trench 141 is set too narrow or too shallow, the alignment liquid cannot be retained in the trench 141, and the alignment liquid is still returned, resulting in alignment. However, if the trench 141 is set too wide, because the frame of the liquid crystal display is continuously reduced, too wide will allow for sufficient normal forces from the sandwiching of the display panel and the film layer 12 will be allowed to shrink.

Additionally, if the trench 141 is set too deep, the substrate will be affected. As illustrated, the preferred width of the trench 141 is between 5 to 40 µm, and the preferred depth of the trench 141 is between 2-15 µm.

In a second embodiment or case the first substrate 11 can be provided as an array substrate wherein the edge contour of the substrate has a region corresponding to the protruding region 13 where the trench region 14 is formed, and the first substrate 11 having the at least one trench 141 in the trench region 14 is an array substrate. In some such embodiments the patterned layer 15 formed in the trench 141 is inorganic. The patterned layer can include at least one of the following layers: a planarization layer, or a metal layer. For details, please refer to the first case as discussed above.

In yet additional embodiments, each of the two substrates included in the display panel can be formed having a trench region about a perimeter thereof, to the protruding region of the edge contour thereof, and at least one trench is provided in the trench region to display the panel.

In other words, the trench regions can be elongated and extend about edges of the substrate. In some such embodiments, such as when the substrates are formed as polygons, the trench regions can extend along opposing edges thereof, wherein each opposing edge provides the necessary retention of the alignment film layer and prevents shrinkage thereof in the dimension extending between the opposing edges. In the case of a rectangular shape, there exists two sets of opposing edges, but more complex polygons may also have additional sets of opposing edges.

In some embodiments the first substrate 11 can be provided a color filter substrate, and the second substrate 11' in the display panel is an array substrate; when the edge contour has a region corresponding to the protruding region 13, a trench region 14 is formed, and at least one of the trench regions 14 is provided. When the first substrate 11 of the trench 141 is a color filter substrate, the patterned layer 15 forming the trench 141 is at least one of a black matrix layer, a colored color resist layer, and a planarization layer;

When the edge contour has a region corresponding to the protruding region 13' formed with the trench region 14', and the second substrate 11' in which the at least one trench 141' is provided in the trench region 14' is an array substrate, the trench 141' is formed. The patterned layer 15 can be provided having an inorganic layer, a planarization layer, and a metal layer. For details, refer to the first case as many of the additional details will be similar thereto.

It should be noted that the two substrates in the display panel of the present disclosure may form a trench region in a region corresponding to at least one protruding region of the edge contour thereof, but not necessarily each trench region has a trench corresponding to the protruding region, and as such there are not necessarily trenches in each protruding region;

For example, when there is a trench on only one substrate, and when the substrate having the trench can exemplified as a rectangle, and the substrate has four protruding regions, but in some instances a trench may only be provided in protruding regions corresponding to three protruding regions.

In some embodiments, when the substrate having the trenches is exemplified as a rectangle, at least one substrate has four protruding regions. In such embodiments, one of the substrates can have a trench in a region corresponding to three of the protruding regions.

Meanwhile, the other opposing substrate can be formed with a trench region in a region corresponding to two of the protruding regions, but only one trench region is provided with a trench. In other words, the trenches are not required to be provided in one-to-one ration corresponding with the protruding regions. It will also be appreciated that the trenches do not necessarily need to extend in a common direction.

The trench in some embodiments of the present disclosure can also exist in other forms in the trench region, for example, the trench can be a closed polygonal annular trench or an irregular line trench in the trench region, as long as the trench can retain the alignment liquid which is retained and the alignment film layer and thus prevent the alignment film layer from shrinking without affecting other functions of the display.

The present disclosure also provides a display apparatus comprising the display panel according to any one of the above aspects.

In some embodiments, the display panel is an LCD display panel, although various embodiments disclosed herein can apply to organic light-emitting diode (OLED) displays or other types of displays.

The display apparatus can further include, for example, a speaker, a power supply, and a controller to control the speaker and the display panel. The display apparatus can be configured as a smart TV, for example, of which various modular components of speakers, microphones, antenna, receivers, set-top boxes, etc., to realize a reconfigurable/expandable/plug-and-play apparatus.

Figure 7:
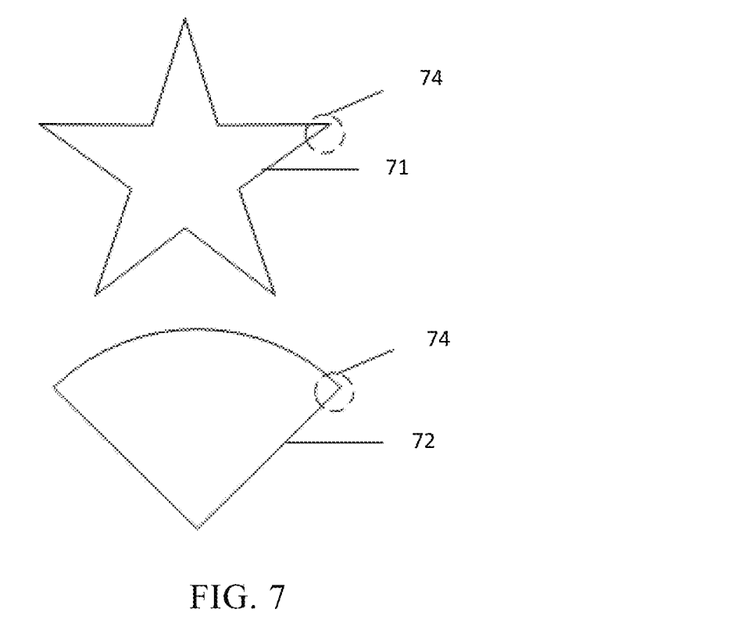
FIG. 7 illustrates a schematic view showing some examples of patterning according to some embodiments of the present disclosure.

FIG. 7 illustrates a schematic view showing some examples of patterning according to some embodiments of the present disclosure.

The first display substrate 71 and the second display substrate 72 can have different patterning shapes. For example, various patterning regions 74 can have different shapes, such as a star, a polygon, a fan shape, etc.

It is apparent that those skilled in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

The foregoing has provided a detailed description of various embodiments of a multi-modal multi-media filtration system and various principles associated therewith. Specific examples are used herein to describe the principles and implementations of some embodiments. The description is only used to help convey understanding of the possible methods and concepts. Meanwhile, those of ordinary skill in the art may change the specific manners of implementation and application thereof without departing from the spirit of the disclosure. The contents of this specification therefore should not be construed as limiting the disclosure.

In the descriptions, with respect to unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the unit(s), device(s), component(s), etc. can be singular, or plural.

Based on various embodiments of the present disclosure, the disclosed apparatuses, devices, and methods may be implemented in other manners. For example, the abovementioned devices can employ various methods of use or implementation as disclosed herein.

Dividing the device into different "regions," "units," or "layers," etc. merely reflect various logical functions according to some embodiments, and actual implementations can have other divisions of "regions," "units," or "layers," etc. realizing similar functions as described above, or without divisions. For example, multiple regions, units, or layers, etc. may be combined or can be integrated into another system. In addition, some features can be omitted, and some steps in the methods can be skipped.

Those of ordinary skill in the art will appreciate that the units, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several submodules.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:
1. A display panel comprising:
a first substrate;
a second substrate being provided parallel to and opposing the first substrate;
a first alignment film layer provided on the first substrate, wherein the first alignment film is sandwiched between the first substrate and the second substrate;
a second alignment film layer provided on the second substrate, wherein the second alignment film is sandwiched between the first substrate and the second substrate;
a patterned layer provided on an opposing surface of the second substrate within a plurality of opposing regions provided on the second substrate; and
a plurality of protruding regions formed about a perimeter edge portion of the first substrate;
wherein:
the plurality of protruding regions include an associated trench region provided in a plurality thereof;
each trench region includes at least one trench, each trench being configured to retain a portion of the first alignment film layer and the second alignment film layer when sandwiched between the first substrate and the second substrate so as to limit shrinkage of the first alignment film layer and the second alignment film layer during operation of the display panel; and
an associated opposing region having the patterned layer being formed directly opposite each trench region as formed in the first substrate.
2. The display panel according to claim 1, wherein:
at least one trench region is formed having a patterned layer; and
at least one trench is formed by the patterned layer.
3. The display panel according to claim 2, wherein the first substrate is a color film substrate, and the second substrate is an array substrate.
4. The display panel according to claim 2, wherein the first substrate is an array substrate, and the second substrate is a color film substrate.

5. The display panel according to claim 3, wherein:
the patterned layer is located on the color filter substrate; and
the patterned layer comprises at least one of a black matrix layer, a colored color resist layer, or a planarization layer.

6. The display panel according to claim 3, wherein:
the patterned layer is located on the array substrate; and
the patterned layer is at least one of an inorganic layer, a planarization layer, or a metal layer.

7. The display panel according to claim 1, wherein:
a perimeter edge of both the first substrate and the second substrate forms a polygonal shape; and
each corner of the polygon shape is provided with one of the protruding regions.

8. The display panel according to claim 1, wherein:
a perimeter edge of both the first substrate and the second substrate forms a polygonal shape; and
the plurality of protruding regions and associated trench regions thereof are provided along at least two sets of opposing edges of the polygon shape.

9. The display panel according to claim 1, wherein the trenches extend in a direction being non-parallel with the edges of each substrate.

10. The display panel according to claim 1, wherein each trench extends in a direction parallel to at least one of the two sides of a corner in which the trench is located.

11. The display panel according to claim 8, wherein each trench extends in a direction parallel to each side of the polygon shape.

12. The display panel of claim 1, wherein:
each of the trench regions comprises a plurality of trenches; and
a distance between each adjacent two trenches is the same.

13. The display panel of claim 1, wherein:
each of the trench regions comprises a plurality of trenches; and
a distance between each adjacent two trenches varies.

14. The display panel according to claim 1, wherein each trench has a width of 5 to 40 μm.

15. The display panel according to claim 1, wherein each trench has a depth of 2 to 15 μm.

16. The display panel according to claim 13, wherein each trench has a depth of 2 to 15 μm.

17. The display panel according to claim 1, further comprising a second alignment film layer provided on the second substrate, wherein the second substrate is also sandwiched between the first substrate and the second substrate.

18. The display panel according to claim 1, wherein:
the first alignment film layer is planar and extends radially beyond each trench; and
the first alignment film layer includes an alignment liquid, a portion of the alignment liquid being retained in each trench.

19. The display panel according to claim 18, further comprising a second alignment film layer;
wherein:
the second alignment film layer is planar and extends radially beyond each trench; and
the second alignment film layer includes a second alignment liquid, a portion of the second alignment liquid being retained in each trench.

20. A display apparatus, comprising the display panel according to claim 19, a speaker, and a controller to control the speaker and the display panel, wherein the display panel is a liquid crystal display (LCD).

* * * * *